United States Patent
Eppensteiner et al.

(10) Patent No.: US 10,311,253 B2
(45) Date of Patent: Jun. 4, 2019

(54) METHOD FOR PROTECTING AN INTEGRATED CIRCUIT AGAINST UNAUTHORIZED ACCESS

(71) Applicant: Siemens AG Oesterreich, Vienna (AT)

(72) Inventors: Friedrich Eppensteiner, Spitz (AT); Majid Ghameshlu, Vienna (AT); Herbert Taucher, Moedling (AT)

(73) Assignee: Siemens AG Österreich, Vienna (AT)

( * ) Notice: Subject to any disclaimer, the term of this patent is extended or adjusted under 35 U.S.C. 154(b) by 0 days.

(21) Appl. No.: 14/913,569

(22) PCT Filed: Jul. 15, 2014

(86) PCT No.: PCT/EP2014/065063
§ 371 (c)(1),
(2) Date: Feb. 22, 2016

(87) PCT Pub. No.: WO2015/024711
PCT Pub. Date: Feb. 26, 2015

(65) Prior Publication Data
US 2016/0203325 A1   Jul. 14, 2016

(30) Foreign Application Priority Data
Aug. 22, 2013 (DE) .................. 10 2013 216 692

(51) Int. Cl.
G06F 21/00 (2013.01)
G06F 21/62 (2013.01)
(Continued)

(52) U.S. Cl.
CPC ............ *G06F 21/629* (2013.01); *G06F 21/55* (2013.01); *G06F 21/71* (2013.01)

(58) Field of Classification Search
CPC .......... G06F 21/72; G06F 21/55; G06F 21/71; G06K 19/07372; H01L 27/0203; G01R 31/31719
See application file for complete search history.

(56) References Cited

U.S. PATENT DOCUMENTS 5,373,289 A   12/1994  Ichinohe
5,530,749 A    6/1996  Easter et al.
(Continued)

FOREIGN PATENT DOCUMENTS

DE   19839041   3/2000
EP    0135422   3/1985
(Continued)

OTHER PUBLICATIONS

Matthew, Using Probabilistic Techniques to Aid in Password Cracking Attacks, 2010, Florida State University, 26-27 (Year: 2010).*
(Continued)

*Primary Examiner* — Christopher C Harris
(74) *Attorney, Agent, or Firm* — Cozen O'Connor

(57) ABSTRACT

A method for protecting an integrated circuit against unauthorized access to key registers, wherein functions and/or applications of the integrated circuit are unlocked and/or activated via data stored in key registers, such as during the start-up of the integrated circuit and/or during ongoing operation, where if such a key register is accessed, the data word used to perform the access is compared with specified key data, and if access via a data word deviating from the specified key data is detected, the access is marked as unauthorized, the access marked as unauthorized is then recorded and evaluated, and after the analysis, appropriate protective measures are triggered to prevent further unauthorized access such that a key register method for protect-
(Continued)

ing sensitive data is expanded in a simple manner and hacker attacks are quickly detected and thwarted.

11 Claims, 1 Drawing Sheet

(51) Int. Cl.
  *G06F 21/71* (2013.01)
  *G06F 21/55* (2013.01)

(56) References Cited

U.S. PATENT DOCUMENTS

| | | | |
|---|---|---|---|
| 5,699,514 A | 12/1997 | Durinovic-Johri et al. | |
| 5,920,690 A * | 7/1999 | Moyer | G06F 12/1433 |
| | | | 711/E12.1 |
| 7,757,295 B1 * | 7/2010 | Hadaaegh | G06F 21/552 |
| | | | 713/189 |
| 7,853,799 B1 * | 12/2010 | Trimberger | G06F 21/76 |
| | | | 380/277 |
| 8,255,700 B2 * | 8/2012 | Kitariev | G01R 31/31719 |
| | | | 380/2 |
| 2003/0005335 A1 * | 1/2003 | Watanabe | G06F 21/70 |
| | | | 726/9 |
| 2003/0167400 A1 * | 9/2003 | Coburn | G06F 9/30098 |
| | | | 713/193 |
| 2003/0177373 A1 * | 9/2003 | Moyer | G01R 31/31719 |
| | | | 713/189 |
| 2003/0233562 A1 * | 12/2003 | Chheda | G06F 12/1466 |
| | | | 713/193 |
| 2005/0233724 A1 | 10/2005 | Van Lammeren et al. | |
| 2005/0242924 A1 * | 11/2005 | Yosim | G06F 21/71 |
| | | | 340/5.74 |
| 2008/0155151 A1 * | 6/2008 | Fifield | G06K 19/07309 |
| | | | 710/200 |
| 2009/0089529 A1 * | 4/2009 | Miranda | G06F 12/1466 |
| | | | 711/164 |
| 2009/0287904 A1 | 11/2009 | Bybell et al. | |
| 2010/0088527 A1 * | 4/2010 | Johnson | A63F 13/98 |
| | | | 713/193 |
| 2011/0016326 A1 * | 1/2011 | Craig | G06F 21/31 |
| | | | 713/185 |
| 2015/0052622 A1 * | 2/2015 | Cabler | G06F 21/558 |
| | | | 726/34 |

FOREIGN PATENT DOCUMENTS

| | | |
|---|---|---|
| EP | 0743602 A1 | 11/1996 |
| EP | 1209551 A2 | 5/2002 |
| EP | 2602952 | 6/2013 |
| GB | 2445303 A | 7/2008 |
| WO | WO 02/05098 | 1/2002 |

OTHER PUBLICATIONS

Search Report dated Dec. 12, 2016 which issued in the corresponding German Patent Application No. 102013216692.3.

* cited by examiner

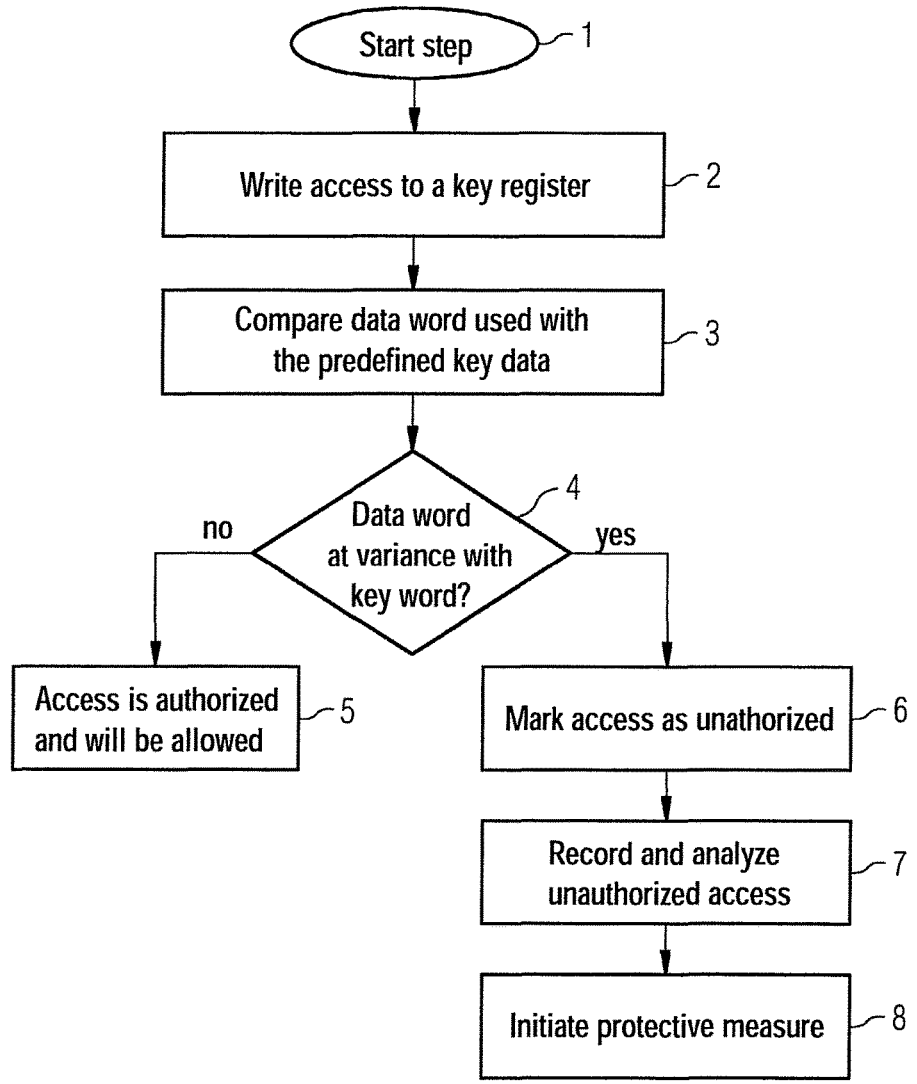

METHOD FOR PROTECTING AN INTEGRATED CIRCUIT AGAINST UNAUTHORIZED ACCESS

CROSS-REFERENCE TO RELATED APPLICATIONS

This is a U.S. national stage of application No. PCT/EP2014/065063 filed 15 Jul. 2014. Priority is claimed on German Application No. 10 2013 216 692.3 filed 22 Aug. 2013, the content of which is incorporated herein by reference in its entirety.

BACKGROUND OF THE INVENTION

1. Field of the Invention

The present invention relates generally to the field of logic circuits, in particular to integrated electronic circuits such as e.g. application-specific integrated circuits (ASICs), field-programmable gate arrays (FPGAs) or system-on-chip and, more specifically, to a method for protecting an integrated circuit against unauthorized accessing of key registers, where via the data stored in the key registers, functions and/or applications of the integrated circuit are enabled and/or activated, e.g., at startup of the integrated circuit and/or during ongoing operation.

2. Description of the Related Art

Particularly in computer technology, electronic or logic circuits nowadays form the basis of any electronics. These circuits are often implemented as integrated circuits. This means that the electronic circuit consists of a circuit comprising interconnected components that are accommodated on a single substrate, usually a semiconductor substrate. An integrated circuit mostly has a large number of diverse components and subassemblies connected via conductor tracks on or in a single-crystal substrate, i.e., the chip. Integration enables circuits having extensive applications and functions to be provided and technically implemented in a small space.

One use of integrated circuits is application-specific integrated circuits (ASICs) that are created for specific applications. With ASICs, the functions and applications of the integrated circuit are explicitly defined as early as the design, development and production stage. That is, they are fixed and are not designed to be manipulated following manufacture. However, there are now also a large number of ASICs that incorporate microprocessors, signal processors, etc. and which therefore offer a degree of flexibility for the functions and applications running thereon.

In contrast to ASICs, field-programmable gate arrays or FPGAs are programmable integrated circuits that can be programmed by definitions of functional structures and by specifying structure rules. This means that the circuit structures of a FPGA can be defined and/or changed after manufacture via data loaded into the FPGA (e.g., structure rules, or wiring diagrams). Using an FPGA chip, different circuits can therefore be implemented by programming and the circuit or implemented functions can then be modified, improved or extended by a user. FPGAs can therefore be used to develop devices ranging from simple counters (e.g., synchronous counters) to highly complex circuits (e.g., microprocessors).

Further miniaturizations and increasing levels of integration now allow complete systems comprising, e.g., a plurality of processors, controllers, memory units, power management and other components to be accommodated on one chip. These systems are known as system-on-chip (SoC) and are used in areas in which small dimensions with relatively high powers and a multiplicity of functions are required, such as in mobile communications, for smartphones, or embedded computers. A system-on-chip incorporates all or at least a large part of the system functions in the form of hardware components (e.g., processors, memory units, or peripheral units) and software components (e.g., applications, or programs) in an integrated circuit on a single chip. The hardware components of the system-on-chip are connected via a mainly hierarchical or at least segmented bus system.

In the case of integrated circuits such as ASICs, or FPGAs, particular functions and applications are protected by key data ("magic keys") against unauthorized accesses, such as hacker attacks, or address space scans. A function protected in this way is, for example, enabling or activating an interface or a specific application reserved exclusively for higher-grade products or software components. When the integrated circuit or unit to which the integrated circuit belongs is powered on, these functions are initially disabled and are only enabled and activated as required by, e.g., a software component or another application of the integrated circuit at startup or also during ongoing operation. In addition, security and safety functions of the integrated circuit are often protected against unauthorized accesses by key data or are activated by key data, e.g., during startup of the integrated circuit after power-on.

For this purpose, the key data or "magic keys" are mainly values hard-coded in the hardware of the integrated circuit, such as a 32-bit data word. These values are then entered in special registers so-called (i.e., key registers or enable registers) using write accesses for enabling and/or activating the corresponding functions or applications. In computer technology, the term register refers to a memory area by which operands and results of calculations or program runs are directly recorded within the integrated circuit. Only when a correct item of key data has been written to the corresponding key or enable register will the associated function, interface, security function, etc. be enabled or activated. Knowledge of addresses of the key registers and key data can therefore make integrated circuits such as ASICs, FPGAs, or SoCs vulnerable to tampering. Therefore, in the case of systematic hacker attacks an attempt may be made to access such information, e.g., via an address space scan or by selective, systematic trying-out of all the possible data values for key data.

Integrated circuits indeed have, for example, security and/or safety functions (mostly in the form of software components). However, these functions mostly only protect the integrated circuit from unauthorized accesses, or data manipulation during ongoing operation. The security functions are, however, mainly not activated until a startup phase of the integrated circuit, e.g., via key registers or enable registers containing key data. In other words, particularly prior to or in the startup phase, the integrated circuit is not protected against unauthorized access especially to key registers and the security functions themselves can be manipulated, as an integrated circuit itself as an electronic (hardware) device does not usually have functionalities for protecting against attacks by, e.g., programs loaded onto the device from outside (e.g., malware). These programs make it possible, for example, to spy out where key registers are located in the address space or which register settings are used to effect particular functions, enabling of interfaces, etc. The information obtained thereby may then, for example, allow the circuit to be replicated and/or permit targeted hacker attacks by which, for example, sensitive data can be manipulated or transmitted out.

It is true that there exists, e.g., the possibility of keeping key registers, the corresponding access addresses and the associated key data secret or concealing them. However, this provides limited protection against attempts to spy out key registers or enable registers or obtain information such as key register addresses and key data via unauthorized accesses. In addition, unauthorized intrusion into the integrated circuit is very difficult to detect and therefore no rapid protective action can be taken.

SUMMARY OF THE INVENTION

It is therefore an object of the invention to provide a method that provides a simple way to quickly detect unauthorized accesses to key registers and initiate appropriate countermeasures.

This and other objects and advantages are achieved in accordance with the invention by providing a method whereby, when key registers are accessed, the data word used is compared with predefined key data. Each access to the key register or key registers of the integrated circuit using a data word that is at variance with the predefined key data is then marked as unauthorized. The accesses marked as unauthorized are then recorded and analyzed. Based on the result of the analysis of the unauthorized accesses, appropriate protective measures against further unauthorized accesses to the key registers are then initiated.

The main aspect of the present invention is that it enables hacker attacks such as systematic write accesses (e.g., trying-out of all the possible values of the key data) to be rapidly detected both in a startup phase of the integrated circuit and during ongoing operation. As no key register accesses can usually be performed by product software or rather software components using false key data values, such accesses can be easily marked as unauthorized, i.e., as possible attacks, and therefore analyzed. Based on this, these attacks can then also be quickly and efficiently terminated by initiating appropriate protective measures, such as a message to the software components (e.g., security function, or safety function), aborting a software component, resetting the entire circuit. In addition, particularly in the circuit's startup phase in which the security functions are mostly not yet activated, the present invention can be used as an active defense and security shield for the integrated circuit or electronic device against hacker attacks and/or reverse engineering attempts. The method provides a simple means of preventing or at least making more difficult any use of sensitive functions of the integrated circuit and unauthorized intrusions, e.g., into the security functions of integrated circuits and systems incorporating ASICs and/or FPGAs.

For analyzing the unauthorized accesses to the key registers, it is advantageous if a number of unauthorized accesses and/or a number of unauthorized accesses within a predefined time period or interval are evaluated. A large number of unauthorized accesses or a high number of unauthorized accesses within a predefined time period or interval enables attacks on the circuit's key registers to be rapidly marked. Write accesses to key registers by internal software components of the circuit using false values do not usually occur, or rather in the case of a software fault such accesses would only occur as an occasional event, but not in a comparatively large number of unauthorized accesses.

In addition, the data word of the access can also be analyzed to detect a deterministic pattern, e.g., a key register is write-accessed using a data word which is incremented. An attack can likewise be inferred therefrom, for example, as an internal software component of the circuit does not successively try out all the possible data words for key data.

During a startup process or startup phase of the integrated circuit during which the security functions are usually not yet activated or being activated, it is advantageous if, based on evaluation of the unauthorized accesses, the security functions are immediately turned on as protective measures, e.g., if an attack has been detected. Security and protective measures are therefore activated which are not usually fully available for defending and protecting the integrated circuit until ongoing operation after a normal startup process, i.e. a startup process without hacker attack. In this way, the integrated circuit can be protected against hacker attacks, or rather the hacker attacks can be made more difficult, even during the startup process.

For a startup process of the integrated circuit it is additionally advantageous if, based on the evaluation of the unauthorized accesses, the integrated circuit is reset to a defined initial state as a protective measure. That is, a reset of the integrated circuit is initiated by which the circuit is returned to a defined initial state. All running software components, particularly the component containing the hacker attack (e.g. malware, or manipulated software program) are therefore terminated. The information obtained by the attack concerning, e.g., functions of the circuit, or register settings, is therefore incomplete and can no longer be used, for example, for reverse engineering.

A reset to the defined initial state of the integrated circuit can ideally be triggered depending on a predefined number of unauthorized accesses. This predefined number of unauthorized accesses can, for example, be fixed in the integrated circuit (e.g., in a hardware component). If this number of unauthorized accesses, i.e., write accesses to a key register using a false data word is exceeded, a reset of the integrated circuit is performed. A number of unauthorized accesses within a predefined time interval or detection of a deterministic pattern in the data words used for the unauthorized accesses can also be used to trigger the reset. This provides a simple way to ensure that, e.g., a one-off unauthorized access (i.e., a key register is accessed using a false data word because of a software fault, for example) does not cause the circuit to be reset.

It is also recommended that the protective measures prior to the startup process, such as immediate activation of the security functions or triggering of a circuit reset, are deactivated after a successful startup process in which no attack or large number of unauthorized accesses has been detected. During ongoing operation, activation of the security functions as a protective measure is no longer necessary, as these are turned on anyway in the event of an orderly startup operation. The protective measure of a reset can be deactivated, for example, after a successful and orderly startup of the integrated circuit, as on the one hand the security functions are now activated, and therefore, on the other hand, a reset of the entire circuit is not accidentally triggered by key register accesses not contained in software components of the circuit.

In an advantageous further embodiment of the invention, a message in the form of an interrupt request or in the form of a special reset request directed to a currently running software component is transmitted during ongoing operation, (e.g., to supplement the security functions) based on the result of analysis of the unauthorized accesses to key registers. By transmitting an interrupt request, the currently running software component of the integrated circuit, which may contain, e.g., program code for the attacks, is interrupted. Then, for example, a predefined interrupt routine is executed by which, e.g., the software component is terminated or a security function for protecting the key registers is launched. With the specific reset request, the currently running software component and therefore, e.g., the malware contained therein can be aborted by resetting of the software component. Any information obtained by unauthorized accesses to the key registers is therefore incomplete and difficult or impossible to use for, e.g., targeted hacker attacks or reverse engineering.

However, it is also advantageous if defined (e.g., particularly sensitive) functions of the integrated circuit are deactivated during ongoing operation if an attack is detected based on the analysis of the unauthorized accesses to the key registers. These functions can then no longer be accessed and it becomes impossible to discover the address range, for example, in which these functions are located, the register settings by which, e.g., the functions can be activated, etc.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

The invention will now be explained in exemplary fashion with reference to the accompanying drawing, in which:

The FIGURE schematically illustrates an exemplary sequence of the inventive method for protecting an integrated circuit against unauthorized access to key registers.

DETAILED DESCRIPTION OF THE EXEMPLARY EMBODIMENTS

The FIGURE schematically illustrates by way of example a sequence of the method for protecting an integrated circuit against unauthorized accessing of key registers. The method in accordance with the invention begins with a start step 1. In a second method step 2, key registers of the integrated circuit are write-accessed. Key registers or enable registers are special registers by which functions such as security functions, or external interfaces, can be activated by, e.g., higher-order software components or software products during the startup process of the integrated circuits or during ongoing operation. For this purpose, particular key data, e.g., 32-bit data words ("magic numbers") mostly hard-coded in the circuit's hardware are written to the key registers by the corresponding software components. If the correct key data word is entered in the corresponding key register, e.g., a function of the integrated circuit is activated or an interface is enabled.

In a third method step 3, the data used for write-accessing the key register or rather the data word used is therefore compared with the predefined key data. In a fourth method step 4, an evaluation is performed to determine whether the data word used by the write-access to the key register matches or is at variance with the key data hard-coded in the hardware of the integrated circuit. If it is ascertained in the fourth method step 4 that the data word used is correct, in a fifth method step 5 the accessing of the respective key register is considered to be authorized, i.e., the write-accessing of the key register is being performed by a higher-order software component and the corresponding function may be activated or the respective interface enabled, as the case may be.

If it is ascertained in the fourth method step 4 that the data word used for write-accessing the key register is at variance with the predefined key data, in a sixth method step 6 this access is marked as unauthorized. In other words, an attempt has been made to access the key register using an invalid data word. These accesses marked as unauthorized are then recorded in a seventh method step 7 and reported to a special software application. The unauthorized accessing of the key registers or enable registers of the integrated circuit can then be analyzed by the software application in the seventh method step 7. For this purpose, a number of unauthorized accesses can be used, for example, as in the event of a targeted or systematic hacker attack it is mainly attempted, e.g., to locate the key registers by multiple accesses, i.e., trial and error, or to find the corresponding data word for activating/enabling. It is likewise possible to evaluate the accesses marked as unauthorized after a number of unauthorized accesses within a predefined time period or interval, as in the case of attacks on the circuit via malware or an address space scan, for example, the corresponding accesses are mostly close together in time, i.e., performed sequentially. In addition, it is also possible for the data words used for the accesses marked as unauthorized to be analyzed for deterministic patterns. Thus, an attack on the circuit can also be inferred from, e.g., all possible values for the key data being tried out successively, e.g., the data word being incremented or decremented.

If, e.g., a hacker attack in which it is attempted to obtain key register addresses and/or the associated key data has now been detected in the seventh method step 7, on the basis of the analysis result corresponding predefined protective measures are initiated in an eighth method step 8. Appropriate protective measures can be taken depending on whether the integrated circuit is undergoing a startup process or circuit operation is ongoing.

In the case of a startup process, in the eighth method step 8 the security functions of the integrated circuit can be activated or an additional protection function switched on, e.g., immediately or early enough to repel the attack. However, the integrated circuit can also be returned to a defined initial state once the attack has been detected. In other words, a circuit reset is performed and therefore, for example, harmful software or a harmful program (malware) terminated. A specified number of unauthorized accesses or of unauthorized accesses within a particular period of time or detection of particular patterns for the data word used can be predefined for triggering the reset, so that resetting of the entire integrated circuit is not initiated immediately, i.e., at every unauthorized access, during the startup process. This specified number of unauthorized accesses can be fixed, e.g., in the circuit's hardware. After a successful startup process in which no attacks have been detected, these defensive mechanisms can be partially or completely deactivated so that, for example, during ongoing operation of the integrated circuit no reset or reinforced protection functions are triggered as a result of accesses by authorized software components. This deactivation is necessary, for example, if software components contain accesses by which the protective measures could be triggered.

During ongoing operation of the integrated circuit, in the eighth method step 8, based on the analysis result from the seventh method step 7, messages, e.g., in the form of interrupt or special reset requests for currently running software components can be transmitted as a protective measure. With an interrupt request, currently running software components are interrupted to execute an interrupt routine. The interrupt routine then, for example, enables the attack on the integrated circuit to be repelled. With a special reset request, e.g., currently running software components can be reset to an initial state, i.e., terminated. This also provides a very simple way to terminate, e.g., malware that may be contained in a software component and terminate the attack. In addition, integrated circuit functions (e.g., particularly sensitive functions) defined in the eighth method step 8 can be deactivated as a protective measure so that the functions can, for example, no longer be spied out or comprehended during a hacker attack.

The respective protective measures initiated by the method in accordance with disclosed embodiments of the invention are therefore designed to prevent the obtaining of information, e.g., concerning the inner workings of the circuit, which can be used to attack the circuit.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for protecting against unauthorized accessing of key registers in an integrated, electronic circuit, wherein functions of the integrated, electronic circuit are at least one of enabled and activated by storing predefined key data in said key registers, the method comprising:
    comparing a used data word with key data when specific key registers are accessed;
    marking the specific key registers accesses using a data word at variance with the stored predefined key data as unauthorized;
    recording and analyzing the specific key registers accesses marked as unauthorized, said analyzing comprising detecting patterns of accesses comprising a data word which is incremented and marked as unauthorized; and
    initiating predefined protective measures after analysis of the unauthorized accesses based on said detected patterns of accesses comprising the data word which is incremented and marked as unauthorized.

2. The method as claimed in claim 1, wherein said unauthorized accesses to the specific key registers comprises evaluating at least one of (i) a number of unauthorized accesses and (ii) a number of unauthorized accesses within a predefined period of time.

3. The method as claimed in claim 2, wherein, in a case of a startup process, security functions of the integrated, electronic circuit are immediately activated as a protective measure based on evaluation of the unauthorized accesses.

4. The method as claimed in claim 2, wherein, in the case of the startup process, the integrated, electronic circuit is reset to a defined initial state as a protective measure based on the evaluation of the unauthorized accesses.

5. The method as claimed in claim 4, further comprising:
    performing a check to determine whether a predefined number of unauthorized accesses has been exceeded for an integrated circuit reset.

6. The method as claimed in claim 2, wherein a message comprising an interrupt request or a specific reset request is transmitted to currently operating components of the integrated, electronic circuit as a protective measure during ongoing operation based on results of the analysis.

7. The method as claimed in claim 2, wherein specified functions of the integrated, electronic circuit are deactivated as a protective measure during ongoing operation based on results of the analysis.

8. The method as claimed in claim 1, wherein, in a case of a startup process, security functions of the integrated, electronic circuit are immediately activated as a protective measure based on evaluation of the unauthorized accesses.

9. The method as claimed in claim 8, wherein the protective measures for the startup process are deactivated after a successful startup.

10. The method as claimed in claim 1, wherein a message comprising an interrupt request or a specific reset request is transmitted to currently operating components of the integrated, electronic circuit as a protective measure during ongoing operation based on results of the analysis.

11. The method as claimed in claim 1, wherein specified functions of the integrated, electronic circuit are deactivated as a protective measure during ongoing operation based on results of the analysis.

* * * * *